United States Patent [19]

Shih et al.

[11] Patent Number: 5,158,714
[45] Date of Patent: Oct. 27, 1992

[54] VAPOR-LIQUID DISTRIBUTION METHOD AND APPARATUS

[75] Inventors: Chien-Cheng J. Shih, Irvine; Ben A. Christolini, Yorba Linda, both of Calif.

[73] Assignee: Union Oil Company of California, Los Angeles, Calif.

[21] Appl. No.: 710,352

[22] Filed: May 30, 1991

[51] Int. Cl.$^5$ .............................................. B01F 3/04
[52] U.S. Cl. .................................. 261/96; 261/114.2; 261/97; 422/220
[58] Field of Search ................ 261/114.2, 96, 97; 422/195, 220

[56] References Cited

U.S. PATENT DOCUMENTS

| | | | |
|---|---|---|---|
| 2,710,177 | 6/1955 | Young et al. | 261/114.2 |
| 2,778,621 | 1/1957 | Zimmerman, Jr. | 261/114.2 |
| 3,685,971 | 8/1972 | Carson | 422/220 |
| 3,895,919 | 7/1975 | Forster et al. | 422/195 |
| 4,140,625 | 2/1979 | Jensen | 261/96 |
| 4,313,908 | 2/1982 | Gupta | 261/96 |
| 4,836,989 | 6/1989 | Aly et al. | 422/220 |
| 4,960,571 | 10/1990 | Bhagat et al. | 422/220 |
| 5,045,247 | 9/1991 | Treese | 261/114.2 |

FOREIGN PATENT DOCUMENTS 0652948  3/1979  U.S.S.R. ............... 261/114.2

Primary Examiner—Tim Miles
Attorney, Agent, or Firm—Gregory F. Wirzbicki; Clark E. DeLarvin

[57] ABSTRACT

A vapor-liquid distribution method and apparatus utilize a cap assembly for attachment over an opening in a deck tray of a gas-liquid contact apparatus (e.g., catalytic reactor). The cap assembly comprises a riser located over the opening in the deck tray, and providing fluid communication from an upper surface to a lower surface of the deck tray. A cap encompasses an upwardly extending end of the riser. A key feature of the assembly is the provision of a dispersion plate in a lower end of the riser which provides a flow restriction for two phase fluids flowing through the riser to produce a mist flow of the two phases. Preferably, the dispersion plate has a plurality of openings therethrough, at least the outer openings being provided with tabs to disperse the mist flow radially outward.

20 Claims, 2 Drawing Sheets

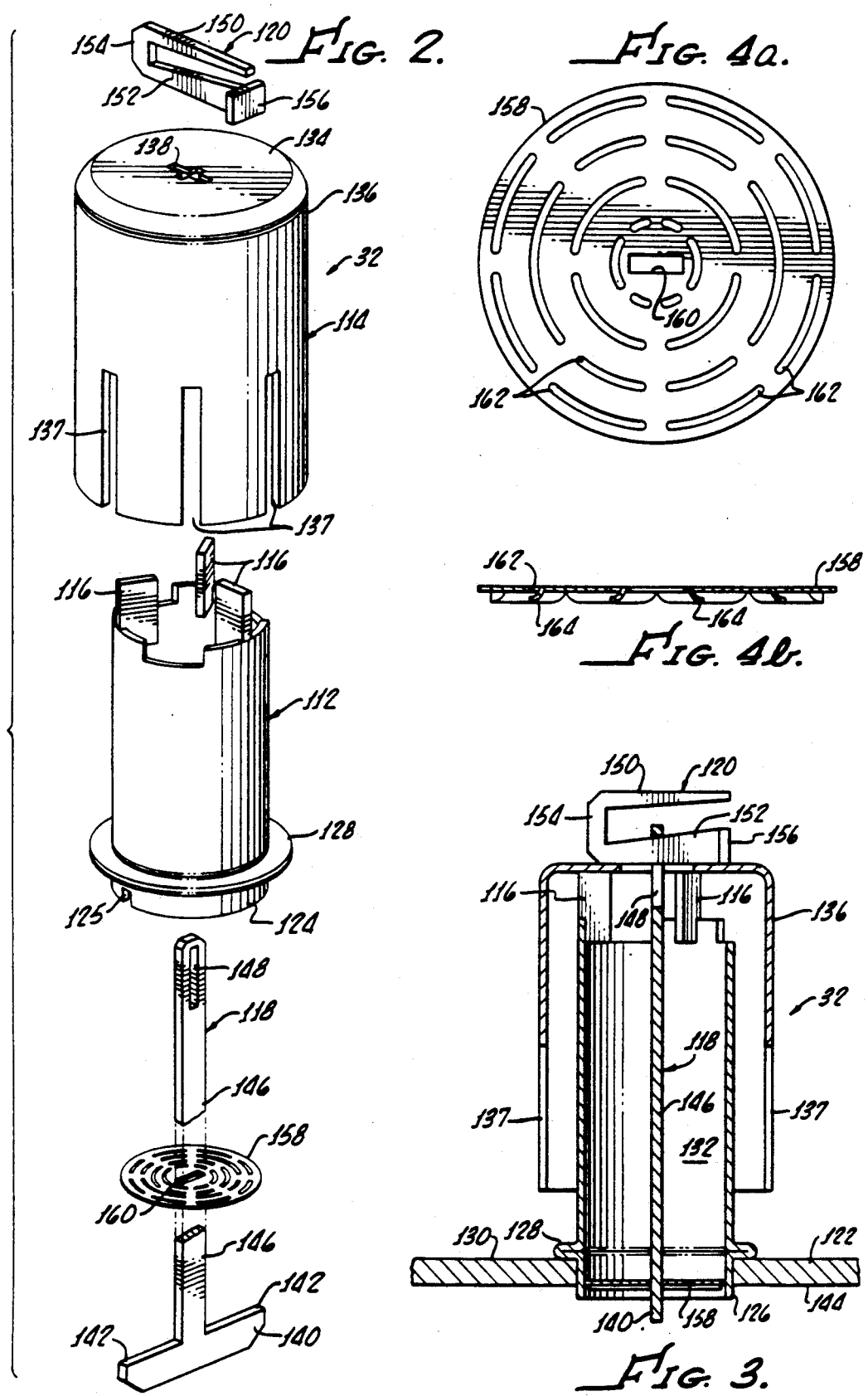

VAPOR-LIQUID DISTRIBUTION METHOD AND APPARATUS

FIELD OF THE INVENTION

This invention relates generally to a method and apparatus for distributing a vapor-liquid, mixed phase feed to a contacting zone in a reactor. The invention particularly relates to an apparatus and method for uniformly distributing vapor-liquid phases into contact with granular solids in a catalytic contactor vessel.

BACKGROUND OF THE INVENTION

Among the various commercial processes practiced, an important one involves the physical or chemical treatment of hydrocarbons and other organic materials with bodies of granular contact material. Frequently such a process involves contacting a two-phase mixture of liquid and vapor with the contacting material and the introduction of such mixtures into the bed of granular contact material in a uniformly distributed manner.

Uniform distribution of a liquid and vapor into a granular bed of contact material is a difficult goal to achieve. In a typical process a vapor-liquid feed material is introduced into a vessel which is divided into an upper and lower portion by one or more distribution trays. The distribution trays are provided with a number of overflow weirs, or the like, and provide the sole means of fluid communication between the upper portion of the vessel and the lower portion of the vessel, the latter of which contains a bed of the granular contact material.

The feed mixture is introduced into the upper portion of the vessel and the liquid collects in a pool or reservoir on the tray from whence it flows over the rims of the weir into the bed of contact material. An inherent disadvantage of such an approach is that the methods of fabrication normally employed in the construction of reactors are not sufficiently precise to ensure an absence of irregularities (differences in the outlet weir elevation, tilting of the weir, tilting of the distribution tray, etc.) in the reactor. In addition the operating conditions within the reactor are frequently such as to bring about distribution tray warping, thus contributing to even more irregularities. As a result, some of the outlets will inevitably exhibit little or no overflow of liquid feed.

It has been proposed to provide slots or V-notches in the weir to minimize the effect of these irregularities. Such proposals have not eliminated the problems associated with irregular flow. Further, the liquid feeds have a tendency to channel down the inner surface of the outlet weir and impinge upon the catalyst bed in relatively thin streams which bury themselves deep in the bed before spreading laterally to any significant extent.

The more common practice is the use of a "bubble cap" assembly. A bubble cap assembly is disposed over each of a plurality of openings in the distribution tray. Each bubble cap assembly comprises a riser portion, generally having the shape of a hollow conduit, and a cap portion which is spaced apart from the riser forming an inverted U shaped flow path for the vapor and liquid. In most designs the cap portion may have a plurality of slots in its lower most outer periphery to accommodate irregularities of the type described above, and variations in liquid flow rates. Such designs have met with commercial success. Nonetheless, there is still need for improvement. It must be appreciated that even a one or two percent increase in yield, which could be obtained by more uniform distribution of the liquid-vapor upon the particulate bed, could amount to millions of dollars per year in, for example, a petroleum refining operation.

SUMMARY OF THE INVENTION

The present invention provides a method and apparatus for ensuring that a mixture of gas and liquid are dispersed as a fine mist onto a contact material. Broadly the invention comprises a cap assembly for attachment to a distribution tray having an opening therethrough. The present invention is particularly suitable for use in a gas-liquid contact apparatus comprising a housing enclosing one or more superimposed distribution trays. Each of the distribution trays is provided with a plurality of cap assemblies.

The present cap assembly comprises a riser located over the opening, having an upwardly extending end, and a cap encompassing and spaced apart from the upper end of the riser. A spacer means is located intermediate the riser and the cap for maintaining the two in a spaced apart relationship with one another. The apparatus further includes means for maintaining the cap in a stationary position over the opening in the deck tray. A key aspect of the invention is a dispersion plate which is located in a filmed passageway within the riser.

Preferably the dispersion plate is located adjacent a lower discharge end of the riser and is provided with a plurality of openings therethrough. The openings in the dispersion plate provide the sole means for fluid communication between an upper portion of the gas-liquid contact apparatus and a lower portion of the gas-liquid contact apparatus which contains the body of particulate contact material. The openings in the dispersion plate provide a substantially reduced fluid flow area which produces a mist flow of liquid and vapor. The mist flow enhances the uniform distribution and contact of the gas-liquid feed with the contact material which enhances the product yield.

BRIEF DESCRIPTION OF THE DRAWINGS

FIG. 2 is an exploded view of a bubble cap assembly construction in accordance with the present invention;

FIG. 3 is a cross sectional elevation view of the bubble cap assembly of FIG. 2; and FIG. 4a is an elevation and 4b a cross sectional view of the dispersion plate of the present invention.

DESCRIPTION OF A PREFERRED EMBODIMENT

Figure 1:
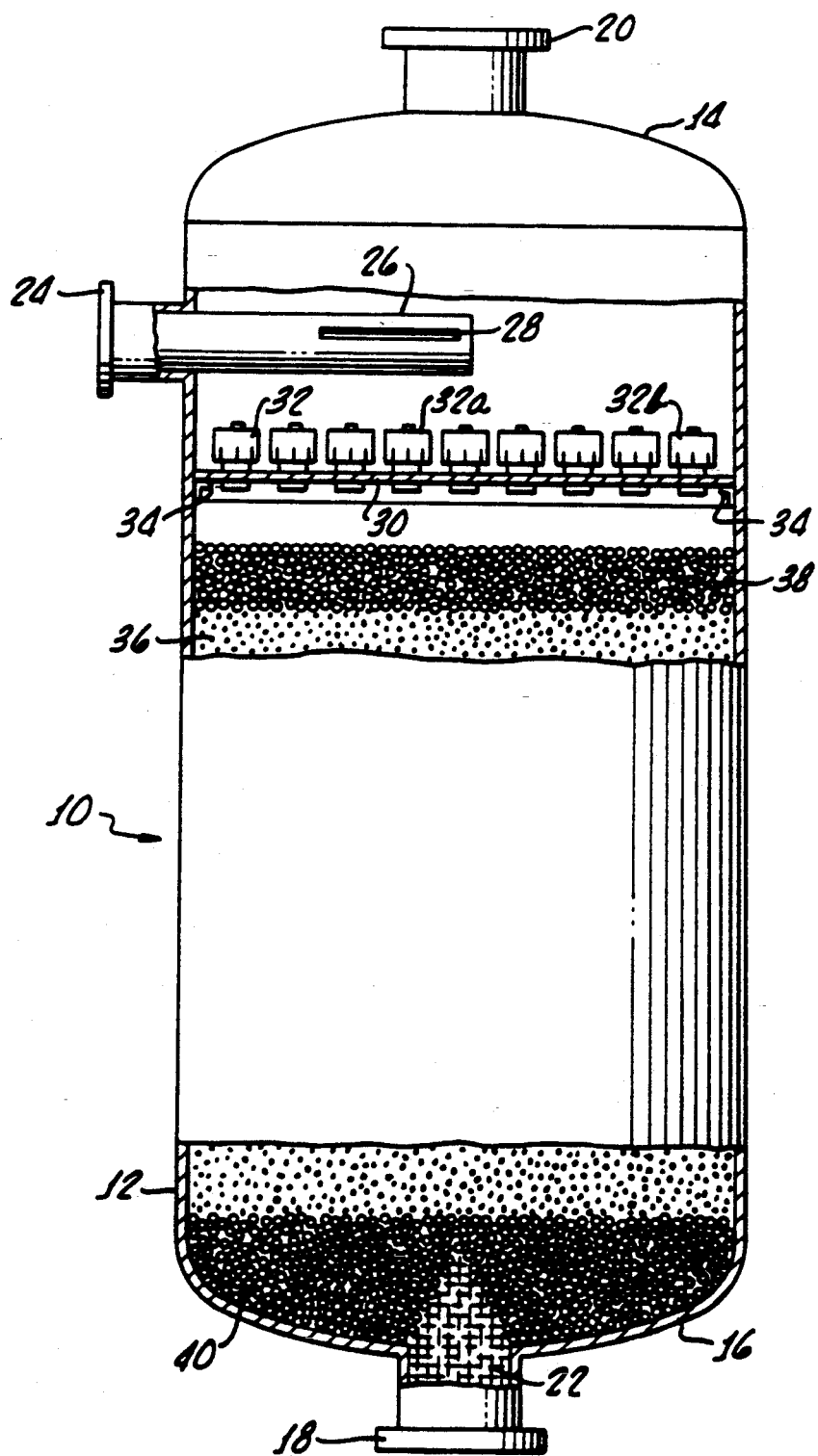
FIG. 1 is an elevation view partly in section of a reactor incorporating the present invention.

It is to be understood that the vapor-liquid, mist phase feed distribution method and apparatus of this invention are broadly applicable to any contacting system and particularly to any down flow reactor contacting system. The method and apparatus are specifically applicable for use in catalytic hydrodesulfurization and hydrocracking reactors. They also can be used to conduct any contacting or treating in which a portion of the feed is in a liquid phase and the balance is in a vapor phase, such as in catalytic polymerization, isomerization, etc., of petroleum hydrocarbons, catalytic hydrogenation of liquid coal extracts, catalytic hydrogenation of aromatic compounds, such as the conversion of benzene to cyclohexane, catalytic oxidation, catalytic chlorination, and the like.

Referring now to FIG. 1, the apparatus therein shown consists essentially of a down flow catalytic reactor 10 with its various internal parts. The reactor comprises a cylindrical vessel 12. Vessel 12 is typically constructed of corrosion resistant metal or an equivalent material such as stainless steel, ceramic or the like, and is normally insulated internally or externally for operation at elevated temperatures. While vessel 12 is substantially cylindrical in the preferred form, it can also be of a non cylindrical shape if desired. Vessel 12 has a outlet conduit 18 in a bottom portion 16. A top portion 14 is provided with a conduit 20 for convenience in filling vessel 12 with catalyst, and for routine maintenance. A foraminous, cone shaped cylindrical grating 22 is located immediately above outlet conduit 18 to act as a barrier to prevent the escape of solids from within vessel 12 through outlet 18 while permitting fluid product to discharge therethrough. A gas-liquid feed is introduced through conduit 20 into the top portion 14 of vessel 12. Typically, quench conduit 24 is provided which includes a sparger 26 comprising a closed pipe with two identical radial slits 28 for injecting a quench gas in two sheet like jets. Additional quench gas can be introduced into vessel 12 through conduit 20 to control temperature if desired.

The features described in the foregoing paragraph are conventional in a great many catalytic reactors. The improvement of the present invention comprises a novel feed distribution system comprising a transverse partition or distribution tray 30 and a plurality of cap assemblies such as shown at 32, 32A and 32B on the drawing. A more specific aspect the invention is directed to the cap assemblies 32, which will be described in more detail later. Typically, distribution tray 30 is securely mounted substantially horizontally within vessel 12 by a circumferential support bracket 34. Distribution tray 30 is substantially vapor and liquid tight, except for the downward openings in the riser of the cap assemblies 32.

Below distribution tray 30, and spaced apart therefrom in vessel 12, is the contacting zone of the reactor in which is disposed a bed of granular catalyst material 36. Typically the bed of granular catalyst material is under a layer of chemically inert pellets 38. The chemically inert pellets act to improve the uniformity of distribution of the feed from distribution tray 30 and prevent disruption of the upper surface of the catalyst bed. Disposed below catalyst bed 36 there frequently will be provided another bed of inert ceramics spheres 40, or the like, surrounding and abutting grate 22. This layer of inert spheres also is optional and may be eliminated completely or replaced by an equivalent or other volume of catalyst materials if desired.

There are many reactor design variations which may be used within the scope of the invention. Reactors suitable for use with the present invention can differ substantially in non-critically aspects from that depicted in FIG. 1. Such reactors can, for example, contain two or more distribution tray-catalyst bed combinations, or units, which can be arranged in series or parallel relationship. It also is not essential that the catalyst bed used in accordance with this invention have layers of inert materials such as described.

The essence of the present invention is in the cap assembly and will be more clear with reference to FIGS. 2-4.

Referring to FIG. 2 therein is depicted an exploded view of the essential parts of a cap assembly 100 constructed in accordance with a preferred embodiment of the present invention. Cap assembly 100 comprises a riser 112, a cap 114, spacer means 116, a retainer member 118, lock means 120, and dispersion plate 158.

The manner in which the various elements of the cap assembly cooperatively interact will be more apparent by reference to FIGS. 2 and 3. Riser 112, which is generally cylindrical in form, preferably is provided with a lower lip or extension 124 which is received within an opening 126 in a deck tray 122. Riser 112 may be cut from a length of tubular material or may be rolled from a length of sheet stock as desired. Riser 112 also includes a flange portion 128 adjacent its lower end which supports the riser on an upper surface 130 of deck plate 122. As depicted, flange 128 is formed as an integral part of riser 112. Alternatively, the flange could be in the form of a separate ring attached to the riser by press fit, shrink fit, welding or any other manner. Riser 112 has an inner passageway 132 which provides substantially the sole means of fluid communication across deck tray 122 through dispersion plate 158.

Cap 114 encompasses an upper end of riser 112. Cap 114 comprises a top wall 134 terminating about its periphery in a downwardly extending skirt 136 which terminates adjacent upper surface 130 of deck tray 122. Frequently, skirt 136 will have a plurality of slots or openings 137 for the passage of fluid therethrough. The function of the slots 137 is to provide a pressure drop thereacross such that the liquid level in the annular space defined by cap 114 and riser 112 is higher than the liquid level on distribution tray 30. The higher liquid level in the annular space will offset any irregularities in liquid level on distribution tray 30 and ensure a substantially uniform gas-liquid flow through each cap assembly, and substantially uniform mixing of the gas and liquid.

Cap 114 further includes a substantially centrally located aperture 138 located in top wall 134. Aperture 138 comprises two rectangular openings superimposed upon and at substantially right angles to one another forming an opening in the shape of a cross, that is, the central points of the two rectangular openings are coincident and preferably are on the axis of cap 114. Typically, one of the rectangular openings is larger than the other, i.e., one has a longer length than the other opening. The function of these two openings will be described later.

Means are provided for maintaining cap 114 and riser 112 in a spaced apart relationship with one another substantially as depicted. As shown in the drawing, this means comprises a plurality of spacers 116 which typically will be fastened to the cap, riser or both. Top wall 134 of cap 114 rests on spacers 116. Spacers 116 also extend radially outwardly and maintain cap 114 substantially centered with respect to riser 112.

Means are provided for securing cap assembly 100 in position on deck tray 122 in communication with opening 126. As shown in the drawings, this means includes a retainer member 118 and lock means 120. Retainer member 118 is disposed within inner passageway 132. A lower end of retainer member 118 is provided with oppositely extending projections 140. Each of projections 140 is provided with an upwardly extending face portion 142 for engagement with a bottom surface 144 of deck tray 122. If the lower lip 124 of riser 112 extends below surface 144 of deck tray 122, it may be necessary to provide a notch 125 (FIG. 2) in lower lip 124 to ensure that faces 142 of retainer member 118 engages bottom surface 144 of deck 122. Alternatively, a notch (not shown) could be provided in faces 142 to accommodate lower lip 124. Retainer member 118 further includes an upwardly extending stem portion 146 which is received through an opening 160 of dispersion plate 158 and through the smaller of the two rectangular openings forming aperture 138 in cap 114. Retainer member 118 is provided with a vertical slot 148 for receiving therethrough a substantial portion of lock means 120.

A locking means 120 comprises two substantially parallel leg members 150 and 152 which are connected at one end by a base member 154. One of the leg members, for example, leg member 152, is in the form of a ramp to provide a wedge means for engagement with slot 148 in retainer member 118 which extends through top wall 134 of cap 114. Leg members 150 and 152 and base member 154 are sized for passage through the larger of the two rectangular openings forming aperture 138 in cap 114. To prevent locking means 120 from passing entirely through aperture 138, leg member 152 is provided with an end piece 156 which is sized to prevent passage of locking means 120 through aperture 138 during installation and removal of the cap assembly. As depicted, end piece 156 is welded or otherwise attached to the end of leg member 152. It will be apparent, however, that it could also be an integral part of leg member 152, for example, by bending the end of leg member 152 to form a comparable end portion.

Referring specifically to FIG. 3, which depicts locking means 120 installed in cap assembly 110 for normal operation, the ramp portion of leg member 152 engages slot 148 in retaining member 118 and presses against top wall 134 of cap 114. The ramp portion acts as a wedge for tightly urging cap 114, spacer means 116 and riser 112 against upper surface 130 of deck tray 122 and concurrently urging faces 142 of retainer member 118 against lower surface 144 of deck tray 122 to retain dispersion plate 158 in position.

During installation of cap assembly 100, retainer member 118 is suspended at its lowest position with respect to cap 114 by locking means 120. The lower end portion 140 of retainer member 118 is inclined and inserted through opening 126 of deck tray 122. After the lower end 124 of the riser 112 is placed within opening 126, retainer member 118 is raised and cap assembly 110 clamped in position by driving the wedge portion of locking means 120 into slot 148 to the position shown in FIG. 3. A readily understood reversal of these steps will permit disassembly from the upper side only of the deck for cleaning or replacement.

Referring specifically to FIG. 4, therein is depicted a preferred embodiment of the dispersion plate of the present invention. Dispersion plate 158 is provided with a centrally located opening 160 for the passage therethrough of the retainer member 118. Plate 158 further includes a plurality of openings 162. The number and size of openings 162 are such as to provide a substantial reduction in cross sectional flow area for the liquid-vapor passing through riser 112. Typically, the cross sectional flow area provided by openings 162 will be from 2 to 75 percent, generally from 5 to 85 percent and preferably from 10 to 40 percent of the internal cross sectional area passageway 132 of riser 112. The purpose of openings 162 is, of course, to ensure that the two phase liquid-vapor feed entering the upper portion of riser 112 will pass in close proximity to one another through the reduced size openings to effect a shearing of the liquid by the vapor and produce a mist flow.

The shape of openings 162 may vary. The openings may be round, square, rectangular or the like The best results have been obtained through the use of slots in a radial pattern as depicted. The slots also may be straight, forming a square or rectangular pattern. The width of the slot may vary depending upon numerous variables including physical properties of the liquid, gas, flow rates, temperature and permissible pressure drop among other things. Generally, slots 162 will have a width of from about 1/16 to 1 inch, preferably from ⅛ to ½ inch, and most preferably from about 3/16 to ¼ inch for most applications wherein a liquid hydrocarbon is treated with a gaseous hydrocarbon. The length and number of openings 162 will be selected to ensure a pressure drop which will both produce the desired mist flow and not be excessive for use in the selected system. Generally, the desired mist flow can be obtained across openings 162, which are usually selected to produce a pressure drop within the range from about 0.1 to 50 inches of water. A preferred pressure drop is within the range from about 0.5 to 15 inches of water and most preferred is in the range of from 1 to 10 inches of water.

It will be noted that dispersion plate 158 has downwardly and outwardly projecting tab members 164 on the outer openings. The function of tab members 164 is to divert the mist flow radially outward from the center of dispersion plate 158 to cover a greater area of contact material. The inner openings 162 are not provided with such tab members. The reason for this is to ensure that an adequate portion of the mist flow will pass downwardly and impinge upon that portion of the contact material located directly beneath the dispersion plate. An advantage of the present invention is that tab members 164 can readily be formed as an integral portion of dispersion plate 158. This is accomplished by not shearing off both sides of the openings 162 when those openings are formed. In a similar manner, of course, the inner openings are sheered on both sides to remove any projections which would divert fluids flowing therethrough. Obviously, tab members could be added to plate 158 by welding, riveting, or the like; however, such fabrication methods would increase the cost without any significant added benefit.

During the practice of the invention it has been found that there are certain criteria which will ensure optimum mist flow exiting from dispersion plate 158. Specifically, if the aperture sizes, pressure drop, and materials are selected to ensure that the following conditions are met:

$$Re_v > 1.2 \times 10^6 / Re_l^{0.8} \qquad (1)$$

where $Re_v = G_v D_e / \mu_v =$ Reynolds Number of vapor $Re_l = G_l D_e / \mu_l =$ Reynolds Number of liquid $G_l$ mass velocity of liquid, lb/hrft$^2$ $G_v$ mass velocity of vapor, lb/hrft$^2$ $D_e$ 4 × cross flow area/wetted perimeter $\mu_l$ liquid viscosity, c.p.

$\mu_v$ vapor viscosity, c.p.

Another flow parameter which may be used to ensure optimum mist flow is determinable by the equation:

$$G_v/\lambda = 22{,}000 \times (-\psi G_l/G_v)^{-0.43} \qquad (2)$$

where $\lambda = [\rho_v/0.075)(\lambda_1/62.3)]^{0.5}$
$\psi = (73/\mu)[\sigma_1(62.3/\lambda_1)^2]^{0.33}$
$\sigma$ = Surface tension of liquid, dynes/cm
$\rho_1$ = Liquid density, lb/ft$^3$
$\rho_v$ = Vapor density, lb/ft$^3$ n a typical commercial hydroprocessing reactor the range of $G_v/\lambda$ should be in the range of from 5,000 to 30,000, and preferably from 10,000 to 20,000.

Having fully described the invention and what is now considered to be its best mode, the invention is not to be limited to the details hereinabove set forth; rather, it should be interpreted in accordance with the spirit and scope of the appended claims.

What is claimed is:

1. A cap assembly comprising:
   a conduit defining a passageway for fluids, said conduit having an entry opening to the passageway and an exit opening from the passageway; a cap located over the entry passageway of the conduit, said cap having a top portion, a downwardly extending skirt portion, and an opening located in the top portion;
   dispersion means, located adjacent the exit opening of said conduit, said means comprising a plate having a plurality of openings therethrough, said openings providing the sole means for fluid to exit said conduit and further providing a cross-sectional flow area of from 5 to 85 percent of that of the conduit;
   spacer means for maintaining a gap between the exit opening of the conduit and the cap; and
   locking means for affixing the cap assembly to a deck tray.

2. A cap assembly as defined in claim 1 wherein the number and size of said openings in said dispersion plate are selected to provide a cross sectional flow area from 10 to 40% of that of the riser.

3. A cap assembly as defined in claim 1 wherein said openings in the dispersion plate are in the form of elongated slots.

4. A cap assembly as defined in claim 3 wherein said slots have a width of from 1/16 to 1 inch.

5. A cap assembly as defined in claim 4 wherein the length and number of slots provide a cross sectional flow area of from 10 to 40% of that of the riser 6. A cap assembly as defined in claim 3 wherein a portion of the slots are provided with tab members adjacent a down stream surface of the dispersion means.

7. A cap assembly as defined in claim 6 wherein the tab members are formed from the dispersion means.

8. A cap assembly for attachment to a deck tray having an opening therethrough comprising:
   a riser having an end for location over the openings, an opposite end, and a fluid passageway extending therebetween;
   a cap located over the opposite end of the riser, the cap having a top portion, a downwardly extending skirt portion and an opening located in the top portion;
   spacer means located intermediate the riser and cap for maintaining a fluid flow path therebetween;
   a retainer member disposed within the passageway in the riser and having (1) a lower end portion for engaging a lower surface of the deck tray, (2) a stem portion connected to the lower end portion and extending upwardly to the opening in the cap and (3) an upper end extending through the cap;
   a dispersion plate located adjacent the lower end of the fluid passageway of the riser, said plate having a plurality of elongated slots, said slots providing the sole means for fluid flow through said passageway, and a substantially centrally located opening in the dispersion plate for the passage therethrough of the stem portion of the retainer member; and
   locking means for urging the cap, spacer means and riser, and the lower end portion of the retainer member together.

9. The assembly of claim 8 wherein the openings in the dispersion plate are sized to produce a pressure drop of from 0.5 to 15 inches of water.

10. The assembly of claim 8 wherein some of the slots are provided with tab members adjacent a downstream surface of the dispersion plate.

11. The assembly of claim 10 wherein the slots have a width of from 1/8 to ½ inch.

12. The assembly of claim 8 wherein the total cross sectional flow area of the slots in the dispersion plate is from 10 to 40 percent of the flow area of the riser.

13. The assembly of claim 12 wherein the slots in the dispersion plate extend substantially radially about the center of the riser.

14. The assembly of claim 13 wherein said slots have a width of from 3/16 to ¼ inch, and the length and number of slots to provide a pressure drop across the dispersion plate of from 1 to 10 inches of water.

15. A method of forming a mist flow of a gas and liquid comprising using the cap assembly of claim 8.

16. The method of claim 15 wherein $G_v/\lambda$ is in the range of from about 5,000 to 30,000.

17. The method of claim 15 wherein the slots extend substantially radially about the center of the riser.

18. The method of claim 15 wherein the number and size of openings int he dispersion plate, and the flow rate of the liquid and gas produce a pressure drop of from 0.5 to 15 inches of water.

19. The method of claim 18 wherein the gas and liquid are passed through the dispersion plate at a rate sufficient to produce a pressure drop of from 1 to 10 inches of water.

20. The method of claim 19 wherein $Re_v$ is greater than $1.2 \times 10^6/Re_1^{0.8}$, wherein $Re_v$ and $Re_1$ are the Reynolds numbers of the gas and liquid, respectively.

* * * * *

UNITED STATES PATENT AND TRADEMARK OFFICE
CERTIFICATE OF CORRECTION

PATENT NO. : 5,158,714

DATED : October 27, 1992

INVENTOR(S) : Shih et al.

It is certified that error appears in the above-identified patent and that said Letters Patent is hereby corrected as shown below:

Claim 2, column 7, line 37, delete "riser" and insert therefor -- conduit --.

Claim 5, column 7, line 45, delete "riser" and insert therefor -- conduit --.

Claim 8, column 7, line 53, delete "openings, and insert therefor -- opening --.

Signed and Sealed this

Fifth Day of October, 1993

Attest:

BRUCE LEHMAN

Attesting Officer

Commissioner of Patents and Trademarks